Patented Oct. 18, 1932

1,883,325

UNITED STATES PATENT OFFICE

JAMES BADDILEY AND JAMES HILL, OF BLACKLEY, MANCHESTER, ENGLAND, ASSIGNORS TO BRITISH DYESTUFFS CORPORATION LIMITED, OF MANCHESTER, ENGLAND

SECONDARY DISAZO DYESTUFFS

No Drawing. Application filed November 2, 1926, Serial No. 145,910, and in Great Britain February 12, 1926. Renewed October 29, 1931.

We have found that secondary disazo dyestuffs prepared by coupling the diazo compound of a nitro-amine of the benzene or naphthalene series with an amine to form a compound capable of re-diazotization, then re-diazotizing and combining with an amine of the benzene or naphthalene series or with a derivative thereof, have the valuable property of dyeing the acetyl cellulose fibre in brown shades of excellent fastness to washing and light.

These dyestuffs are represented by the following general formula $$(NO_2)_x - R - N = N - R - N = N - R - NH_2$$

in which $x$ is 1 or 2 and R represents a benzene or naphthalene residue free from sulphonic acid or sulphonate groups. Dyes of this type are dark brown to black powders, soluble in water and dissolving in concentrated sulphuric acid to form blue to violet solutions, yielding red-violet precipitates on dilution with water. They dye acetyl cellulose in even level brown shades.

Suitable first components are meta-nitraniline, para-nitraniline, 2:4-dinitraniline, 4:5-dinitro-α-naphthylamine, and picramic acid; as middle components may be used aniline, meta-toluidine cresidine (4-methoxy-3-amino-toluene), alpha-naphthylamine, 1:2-amino naphthol-ether, and as end components m-phenylene-diamine, m-toluidine, cresidine, α-naphthylamine and the like. By selecting and combining the various components of the groups shown above, dyestuffs of a wide range of shades may be produced. But it may be understood that these examples do not in any way limit the scope of the invention.

We are aware that amino azo compounds have been diazotized and coupled with arylamides of 2:3 hydroxy naphthoic acid. The dyestuffs produced by such couplings are essentially different in structure from those of the present invention. They are suitable for dyeing cotton, but are not suitable for dyeing acetyl cellulose. We make no claim to the products produced by such coupling.

In the following examples which illustrate methods of preparing the new dyestuffs, the parts are given by weight:—

Example 1

138 parts of p-nitraniline are diazotized in the usual way and into the diazo solution is poured a solution of m-toluidine, prepared by dissolving 107 parts m-toluidine in 370 parts of 10 per cent hydrochloric acid and 1000 parts of water. When the combination is complete, 370 parts of 10 per cent hydrochloric acid are added and then 69 parts of sodium nitrite, the mixture being stirred until diazotization is complete. A solution of 137 parts cresidine (4-methoxy-3-aminotoluene) in 370 parts 10 per cent hydrochloric acid and 1000 parts of water is then poured into the diazo solution and sodium acetate added to complete the combination. The dyestuff is then isolated in the usual way. It has the probable formula

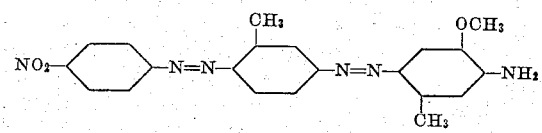

It gives full brown shades on acetyl cellulose.

If metanitroaniline be used in place of paranitroaniline in this combination, the resulting dyestuff has a yellower shade. In this case the dyestuff has the probable formula

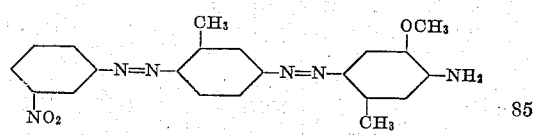

Dyestuffs giving deeper shades may be obtained by using cresidine or alpha-naphthylamine as the middle component. This modification of Example 1 produces dyestuffs having a structure which, in the case of cresidine is probably,

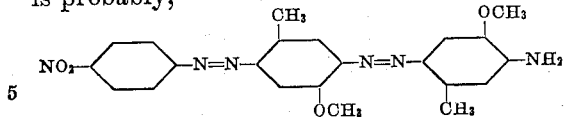

and in the case of alpha-naphthylamine probably is

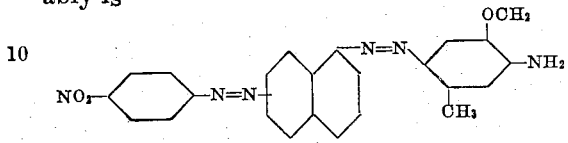

The dyestuffs prepared from picramic acid as first component also give deep shades. When picramic acid is used in place of para-nitraniline in Example 1, the dyestuff produced has the probable formula

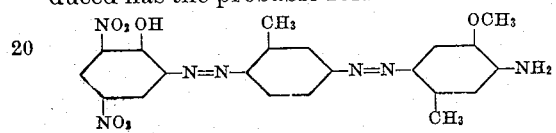

and when used in the modifications of Example 1, in which cresidine and alpha-naphthylamine are middle components the dyestuffs produced have respectively the probable formulæ

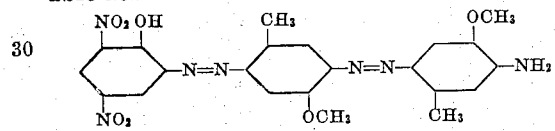

and

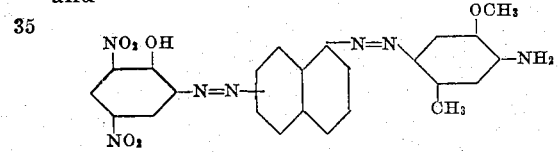

Example 2

183 parts 2:4-dinitraniline are diazotized by the aid of nitrosyl sulphuric acid and to the diluted diazo solution is added a solution of 137 parts of the cresidine solution stated in Example 1. Sodium acetate is then added to complete the coupling and the dyestuff is filtered off and made into a thin paste with water. It is then acidified with 925 parts of 10 per cent hydrochloric acid and diazotized by the addition of 69 parts sodium nitrite. To the mixture is then added a solution of 108 parts of m-phenylene-diamine in 2000 parts of warm water, sodium acetate being then added to complete the combination. The dyestuff is then isolated in the usual way. It has the probable formula

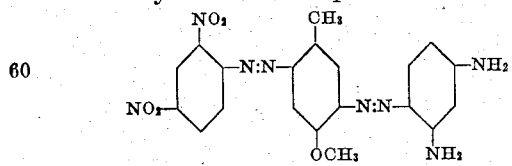

It dyes the acetyl cellulose in red-brown shades.

The dyestuffs produced in accordance with Examples 1 and 2 and the indicated modifications thereto are represented by the probable general formula

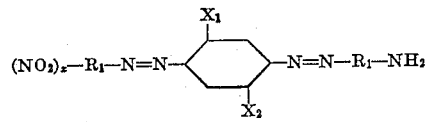

wherein $x$ equals 1 or 2, $R_1$ represents a benzene residue $X_1$ equals H or $CH_3$ and $X_2$ equals H or $OCH_3$ and in which the $NH_2$ group is connected para to the azo group. Dyestuffs of this type are dark brown to black powders, insoluble in water and dissolving in concentrated sulphuric acid to form blue to violet solutions, yielding red-violet precipitates on dilution with water. The dye acetyl cellulose in even level brown shades.

The new dyestuffs, which are insoluble, are applied to acetyl silk directly from a suspension in water or dispersing methods may be employed, for example, the use of dispersing agents such as the acid resins, lignone sulphonic acid, and the like; protective colloids, thickeners and/or solvents may also be added, if desired.

The following is an example of a dyeing process using the materials described, but we in nowise limit ourselves to the details given therein.

Example 3

The dyestuff paste containing one part of the dyestuff prepared according to Example 1 is added to the dyebath containing a very small amount (about 1/100th part) of the acid resin obtained by condensing naphthalene sulphonic acid with formaldehyde and to the lukewarm dyebath is then added 100 pounds of cellulose acetate yarn. The temperature is raised to 80° C. during half an hour and the material is dyed for a further half an hour at this temperature. It is then washed and dried in the usual way, giving a bright reddish-brown dyeing of even level shade.

What we claim and desire to secure by Letters Patent is:—

1. As new secondary disazo dyestuffs, suitable for dyeing acetyl cellulose, the dyestuffs having the general formula $$(NO_2)_x - R - N = N - R - N = N - R - NH_2$$

where $x$ is 1 or 2 and R represents a benzene or naphthalene residue free from sulphonic acid or sulphonate groups and which dye acetyl cellulose in even level brown shades.

2. As new secondary disazo dyestuffs suitable for dyeing acetyl cellulose, the dyestuffs having the general formula $$(NO_2)_x - R_1 - N = N - R_1 - N = N - R_1 - NH_2$$

where $x$ is 1 or 2 and $R_1$ represents a benzene residue free fom sulphonic acid or sulphonate groups, and which dye acetyl cellulose in even level brown shades.

3. As new secondary disazo dyestuffs suitable for dyeing acetyl cellulose, the dyestuffs having the probable formula

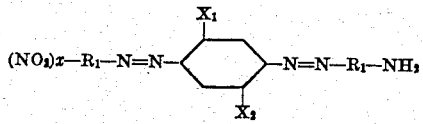

where $x$ is 1 or 2, $R_1$ represents a benzene residue free from sulphonic acid or sulphonate groups, $X_1$ equals $CH_3$ or H and $X_2$ equals H or $OCH_3$ and in which the $NH_2$ group is connected para to the azo group; the said dyestuffs dyeing acetyl cellulose in even level brown shades.

4. As new secondary disazo dyestuffs suitable for dyeing acetyl cellulose, the dyestuffs having the probable formula

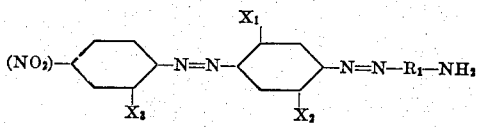

where $R_1$ represents a benzene residue free from sulphonic acid or sulphonate groups, $X_1$ equals H or $CH_3$, $X_2$ equals H or $OCH_3$, $X_3$ equals H or $NO_2$ and in which the $NH_2$ group is connected para to the azo group; the dyestuffs being dark brown to black powders, insoluble in water and dissolving in concentrated sulphuric acid to form blue to violet solutions, yielding red-violet solutions on dilution with water, and dyeing acetyl cellulose in even level brown shades.

5. As new secondary disazo dyestuffs suitable for dyeing acetyl cellulose, the dyestuffs having the probable formula

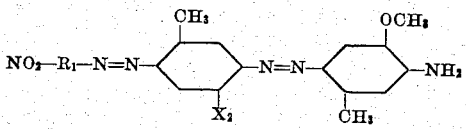

where $R_1$ represents a benzene residue, $X_2$ equals H or $OCH_3$; the said dyestuffs being dark brown to black powders, insoluble in water and dissolving in concentrated sulphuric acid to form blue to violet solutions, yielding red-violet solutions on dilution with water, and dyeing acetyl cellulose in even level brown shades.

6. As a secondary disazo dyestuff suitable for dyeing acetyl cellulose, the dyestuff having the probable formula

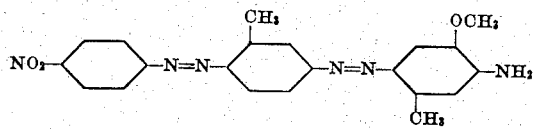

and which dyes acetyl cellulose in even level brown shades.

In testimony whereof we affix our signatures.

JAMES BADDILEY.
JAMES HILL.